United States Patent
Pitsch et al.

(10) Patent No.: US 8,506,280 B1
(45) Date of Patent: Aug. 13, 2013

(54) LIP ADJUSTMENT SYSTEM HAVING CROSS-BAR

(75) Inventors: Brian M. Pitsch, Jim Falls, WI (US); Jesse J. Schemenauer, Chippewa Falls, WI (US)

(73) Assignee: Allied Dies, Inc., Chippewa Falls, WI (US)

( * ) Notice: Subject to any disclaimer, the term of this patent is extended or adjusted under 35 U.S.C. 154(b) by 346 days.

(21) Appl. No.: 12/953,231

(22) Filed: Nov. 23, 2010

(51) Int. Cl.
*B29C 47/16* (2006.01)

(52) U.S. Cl.
USPC .................. 425/192 R; 425/381; 425/466

(58) Field of Classification Search
USPC ...................... 425/192 R, 381, 466
See application file for complete search history.

(56) References Cited

U.S. PATENT DOCUMENTS

| | | | | | |
|---|---|---|---|---|---|
| 3,813,204 | A | * | 5/1974 | Gregory | 425/466 |
| 5,208,047 | A | * | 5/1993 | Cloeren et al. | 425/141 |
| 5,259,747 | A | | 11/1993 | Cloeren | |
| 5,679,383 | A | * | 10/1997 | Ryan et al. | 425/141 |
| 6,017,207 | A | | 1/2000 | Druschel | |
| 6,663,375 | B1 | | 12/2003 | Ulcej | |
| 2007/0290398 | A1 | | 12/2007 | Druschel et al. | |

* cited by examiner

*Primary Examiner* — James Sanders
(74) *Attorney, Agent, or Firm* — Anthony J. Bourget

(57) ABSTRACT

The invention comprises a die apparatus including a flexible lip for adjusting a gap between the flexible lip and a second lip. The apparatus include a cross-bar contacting the lip and extending substantially the length of the lip, where the cross-bar is connected to linear moving members. The linear moving members may be moved, for instance, through pivoting pivot members. The pivoting members may pivot by adjusting a slide bar. As a result, the dimensions of the gap may be changed by moving the slide bar in a first direction or a second direction.

21 Claims, 10 Drawing Sheets

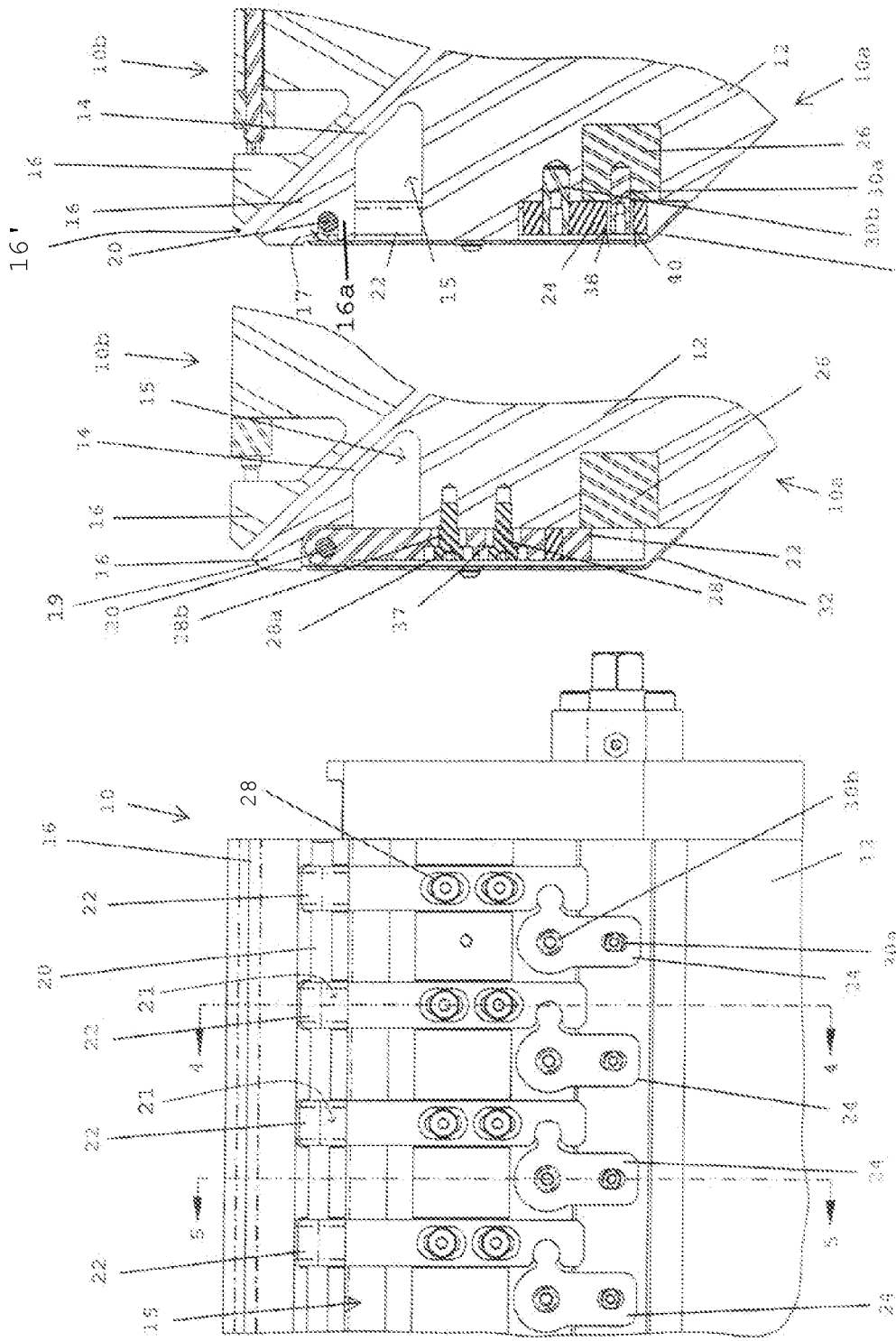

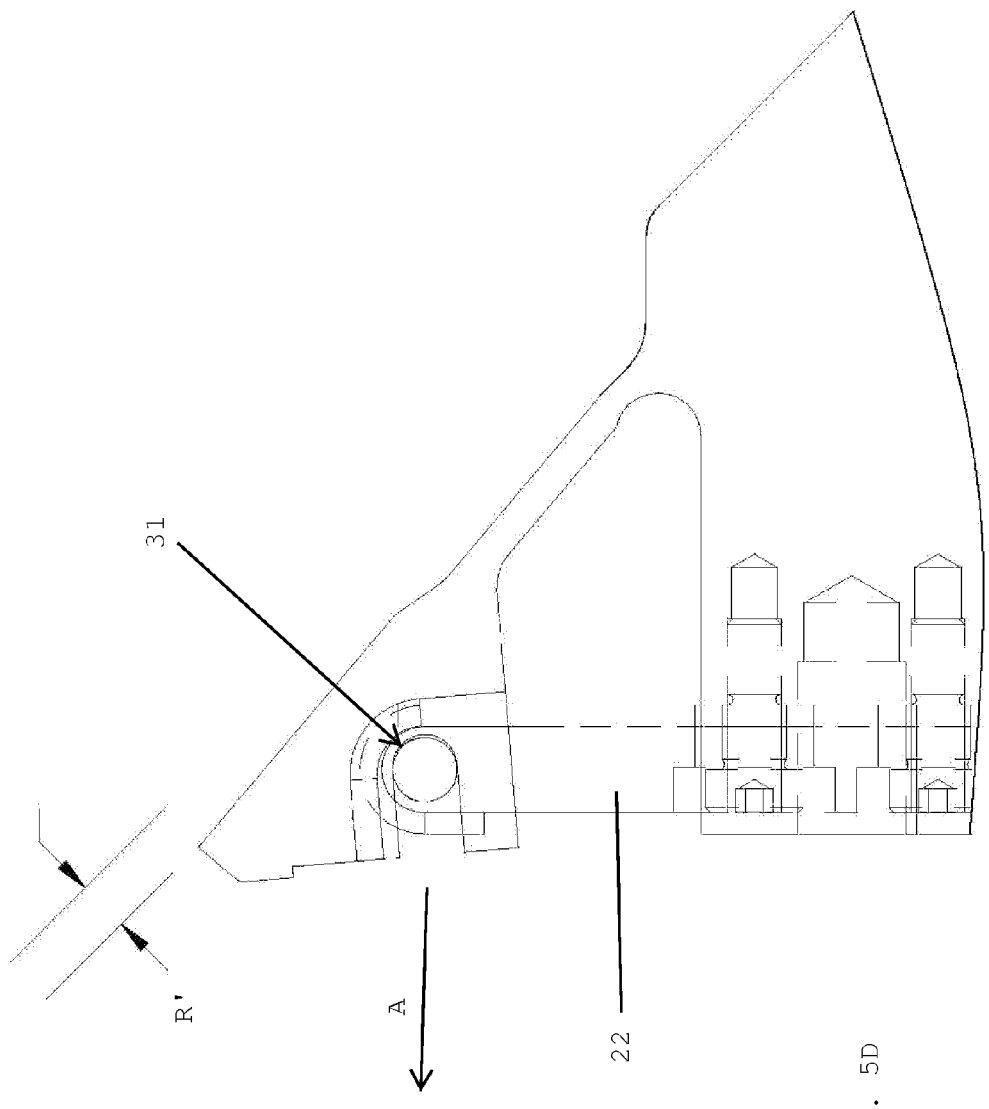

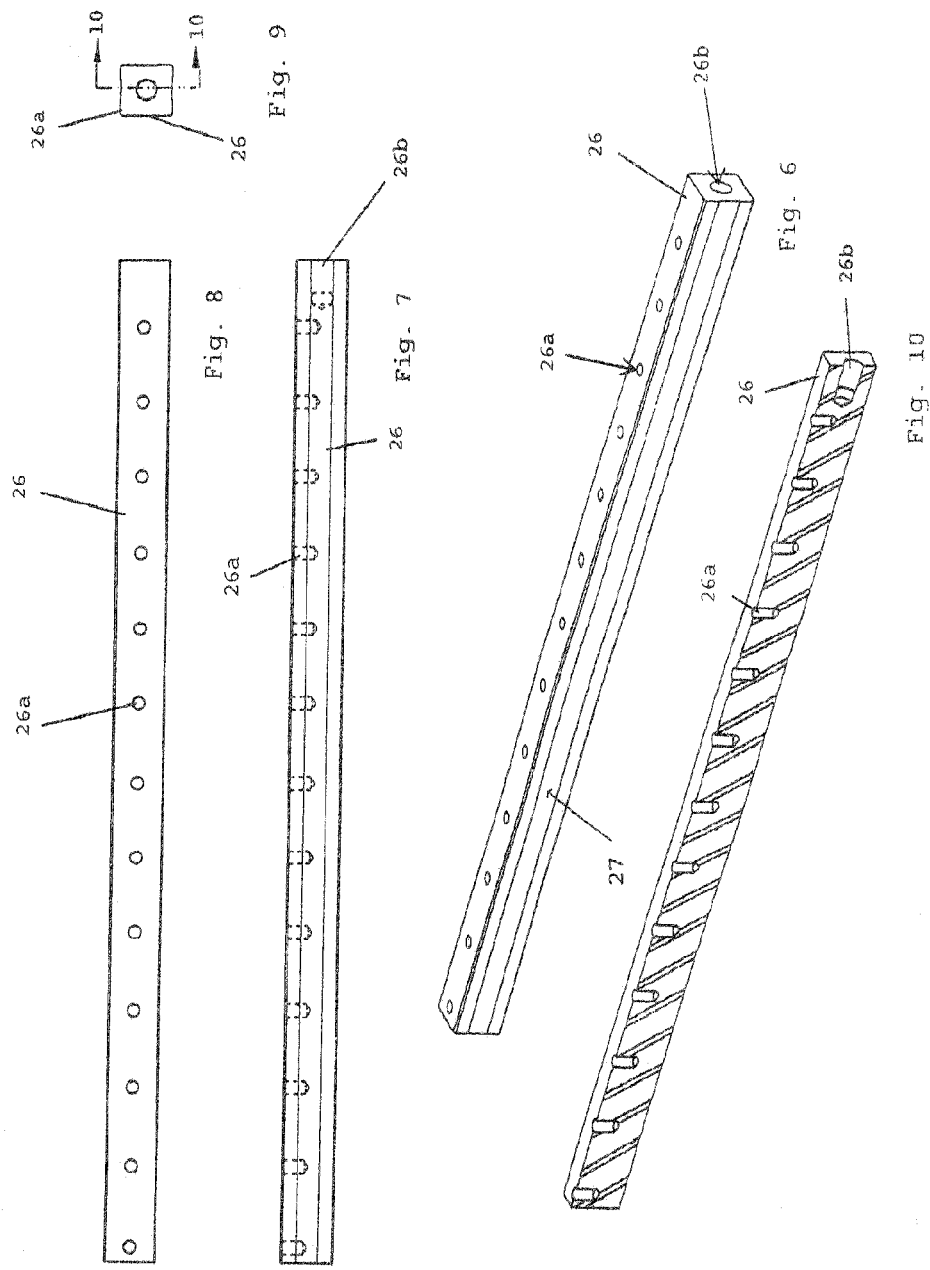

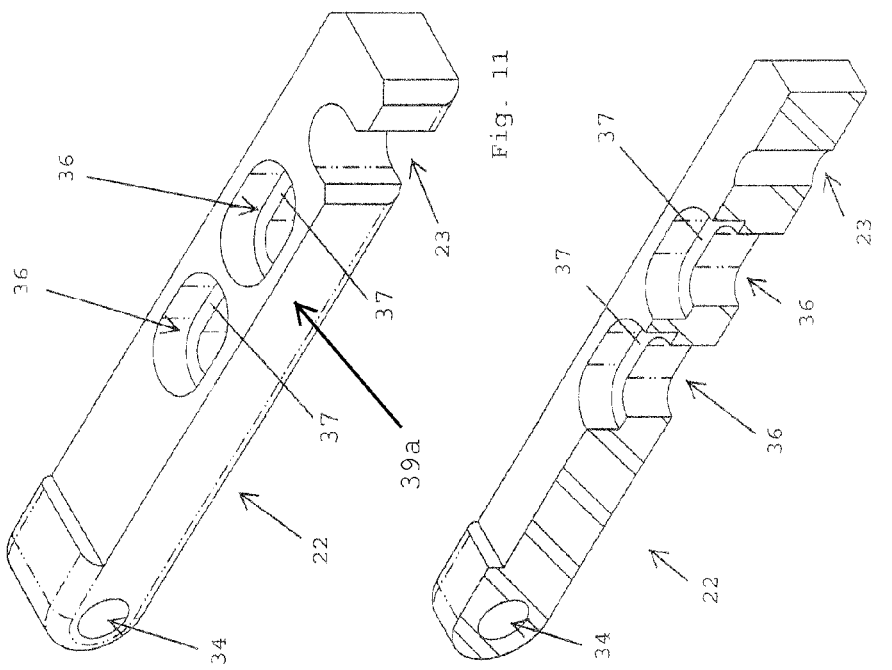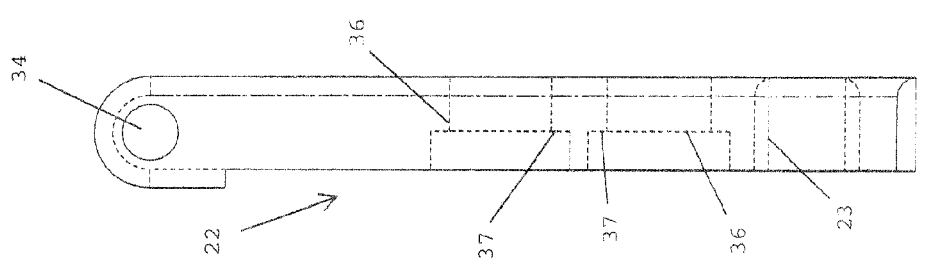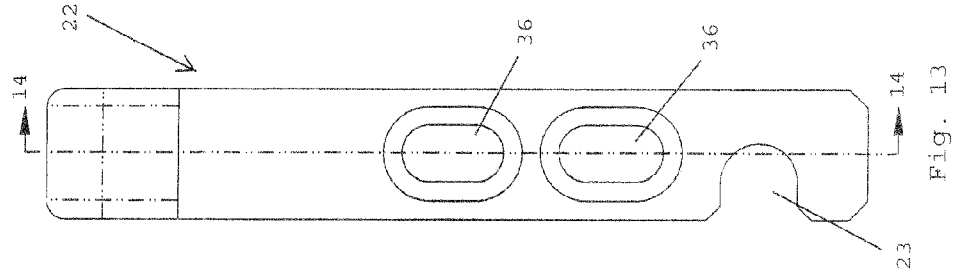

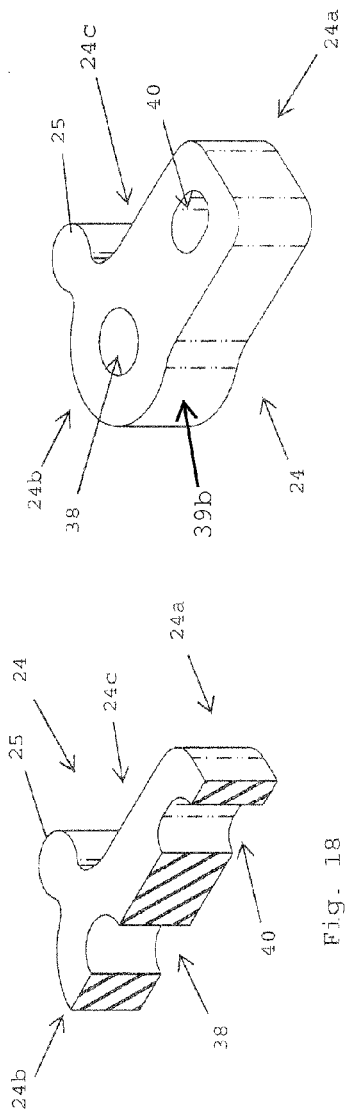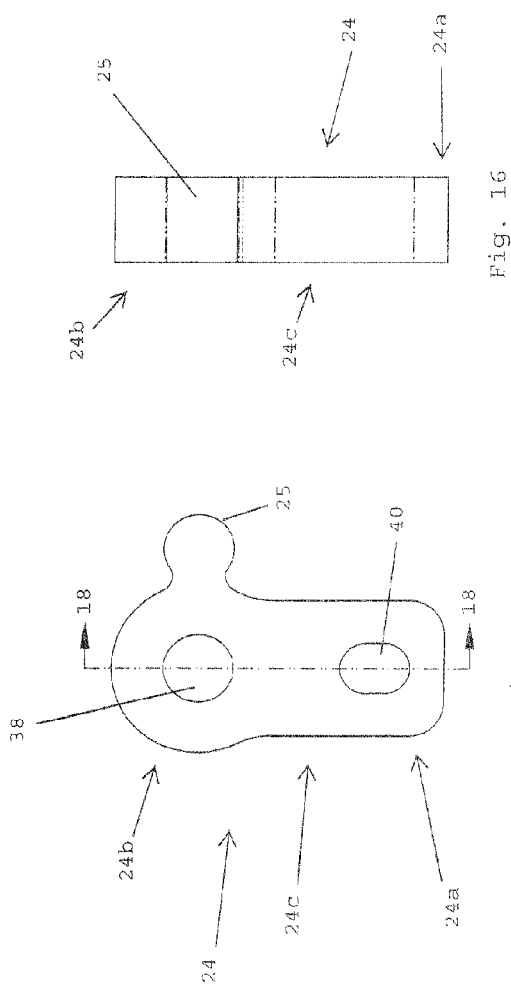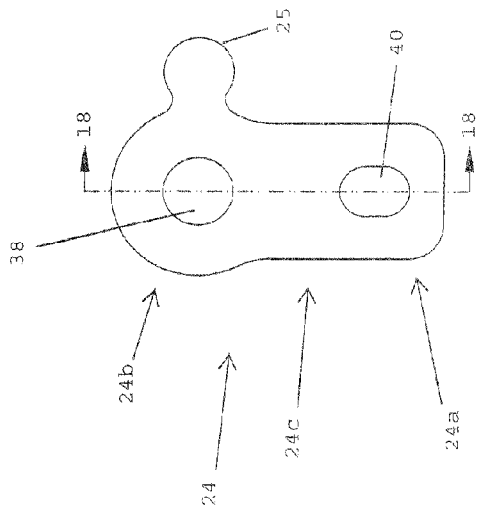

LIP ADJUSTMENT SYSTEM HAVING CROSS-BAR

BACKGROUND OF THE INVENTION

1. Field of the Invention

The present invention relates generally to dies for extruding materials, and more specifically to die adjustment devices for adjusting a gap or gaps between adjacent portions of die bodies.

2. Background Information

Flat sheet or film extrusion dies typically include a pair of die bodies that operate to form an outlet through which material is extruded. Each die body may typically include a lip, where the lips may at least partially form the outlet. Further, at least one of the lips may be a flexible lip that is capable of being adjusted to provide a particular sheet or film thickness of the material.

The flexible lips of the prior art extrusion dies may be adjusted and controlled by a controlling mechanism, as exemplarily described in U.S. Pat. No. 6,663,375 ("'375") to Ulcej and U.S. Pat. No. 6,017,207 ("'207") to Druschel, incorporated fully herein by reference. As shown in the '375 and '207 patents, a controlling mechanism may include links, where the links directly push or pull on a portion of a flexible lip to cause movement of the flexible lip. Further, the links may be actuated by movement of an adjustment bar that slides along a main portion of the die body having the flexible lip.

While the prior art has provided examples of features of die lip adjusting mechanisms, there is always room for further improvement.

SUMMARY OF THE INVENTION

Although die adjusting mechanisms may be known for adjusting a gap between lips of adjacent die bodies, the inventors have realized improvements thereon. Applicants have realized that known adjusting devices fail to teach a die adjusting apparatus that provides bi-directional, quick, accurate and repeatable adjusting of the gap between lips of adjacent die bodies. Prior devices have also been deficient in maintaining a uniform gap that runs the width of the die, especially for dies that are relatively wide. Applicants have realized these deficiencies and have combined the below objectives in a novel manner to provide a die adjusting device that has been developed for the purpose of being able to swiftly and accurately adjust the spacing between adjacent lips of die bodies.

In accordance with an aspect of the invention, the device is directed toward a system usable with die apparatuses including two die bodies. The die bodies of a die apparatus may include a main body, a hinge and a lip. Further, the device and system may include a cross-bar, linear moving members, slide fasteners, pivoting members, pivot fasteners and a sliding member all in adjustable connection, or integrally formed, with the die bodies. At least one of the die bodies may include a flexible lip that moves toward and away from a paired lip of the second die body, where the movable lip moves about a hinge coupled to a main body.

In operation of the inventive system, the sliding member, within or upon the main body portion, may connect to a plurality of pivoting members via first pivot fasteners and the pivoting members may be pivotally secured to the main body portion with second pivot fasteners. Each pivoting member includes a tongue which engages a groove of an associated linear moving member. Each linear moving member may be connected to the cross-bar, where the cross-bar may be in operable connection with a lip. Further, the plurality of linear moving members may include elongated openings located between a location of the groove and a location where linear moving members connect with the cross-bar. Such elongated openings allow linear moving members to undergo a sliding action relative to slide fasteners engaging linear moving members with the main body portion through the elongated openings. As a result of the connections, when the sliding member is adjusted, pivoting members pivot causing linear moving members to move linear, and as the linear moving members move, the cross-bar operates on the flexible lip and moves the flexible lip toward or away from its paired lip depending on the direction of adjustment of the sliding member.

An object of the inventive system is to provide an adjustment mechanism for accurately and repeatedly adjusting dimensions of a gap between lips of die bodies in an extrusion die.

An object of the inventive system is to provide a single-point adjustment system on a dual lip die, where the adjustment system is used to extend (or close) the lip opening range, and to do so quickly.

An object of the inventive system is to provide an adjustment system for extrusion processes in the sheeting industry to allow for a wide range of lip-gap dimensions.

It is a further object of the system to provide a separate cross-web gauge (i.e., lip gap) adjustment mechanism that is separate from the overall gap adjustment.

It is a further object of the system to provide a system for making broad lip gap adjustments by having a single-point adjustment device, so as to allow an operator to open or close the lip (i.e., adjust the lip gap dimensions) from a single control.

It is a further object of the invention to provide a system for controlling machine-direction orientation in the extruded sheets. It is often desired to adjust the lip opening to be as close to the finished web thickness as possible. This is accomplished by controlling the machine direction (MD) orientation. The relationship between the lip opening and the finished web thickness is called the draw ratio.

It is a further object of the invention to provide a lip adjustment system for cleaning particles or carbon from the lip gap, where the lips may be opened to create space for contamination materials to flush through the die lips while quickly returning to a preset gap dimension after the contamination materials flush.

It is a further object of the invention to provide an expedient system allowing for precise and repeatable adjustment of the gap between lips of die bodies in an extrusion die.

It is a further object of the invention to provide a system that uses simple parts having low manufacturing costs and parts that are easily replaceable.

The above summary of the present invention is not intended to describe each illustrated embodiment, aspect, or every implementation of the present invention. The figures and detailed description that follow more particularly exemplify these and other embodiments and further aspects of the invention.

BRIEF DESCRIPTION OF THE DRAWINGS

The invention may be more completely understood in consideration of the following description of various embodiments of the invention in connection with the accompanying drawings, in which:

FIG. 3 is a partial side view of a feature of the invention.

FIG. 4 is a partial cross-sectional view of a feature of the invention taken along the line 4-4 in FIG. 3.

FIG. 5A is a partial cross-sectional view of a feature of the invention taken along the line 5-5 in FIG. 3.

FIG. 5D is a partial cross-section view of a further aspect of the invention.

FIG. 6 is a perspective view of a feature of the invention.

FIG. 7 is an elevation view of the feature of the invention in FIG. 6.

FIG. 8 is a top view of the feature of the invention in FIG. 6.

FIG. 9 is an end view of the feature of the invention in FIG. 6.

FIG. 10 is a cross-sectional view of the feature of the invention in FIG. 6 taken along line 10-10 of FIG. 9.

FIG. 11 is a perspective view of a feature of the invention.

FIG. 12 is an elevation, side view of the feature of the invention in FIG. 11.

FIG. 13 is a top view of the feature of the invention in FIG. 11.

FIG. 14 is a cross-sectional view of the feature of the invention taken along the line 14-14 in FIG. 13.

FIG. 15 is a perspective view of a feature of the invention.

FIG. 16 is a side view of the feature of the invention in FIG. 15.

FIG. 17 is a top view of the feature of the invention in FIG. 15.

FIG. 18 is a cross-sectional view of the feature of the invention in FIG. 15 taken along the line 18-18 of FIG. 17.

Figure 1:
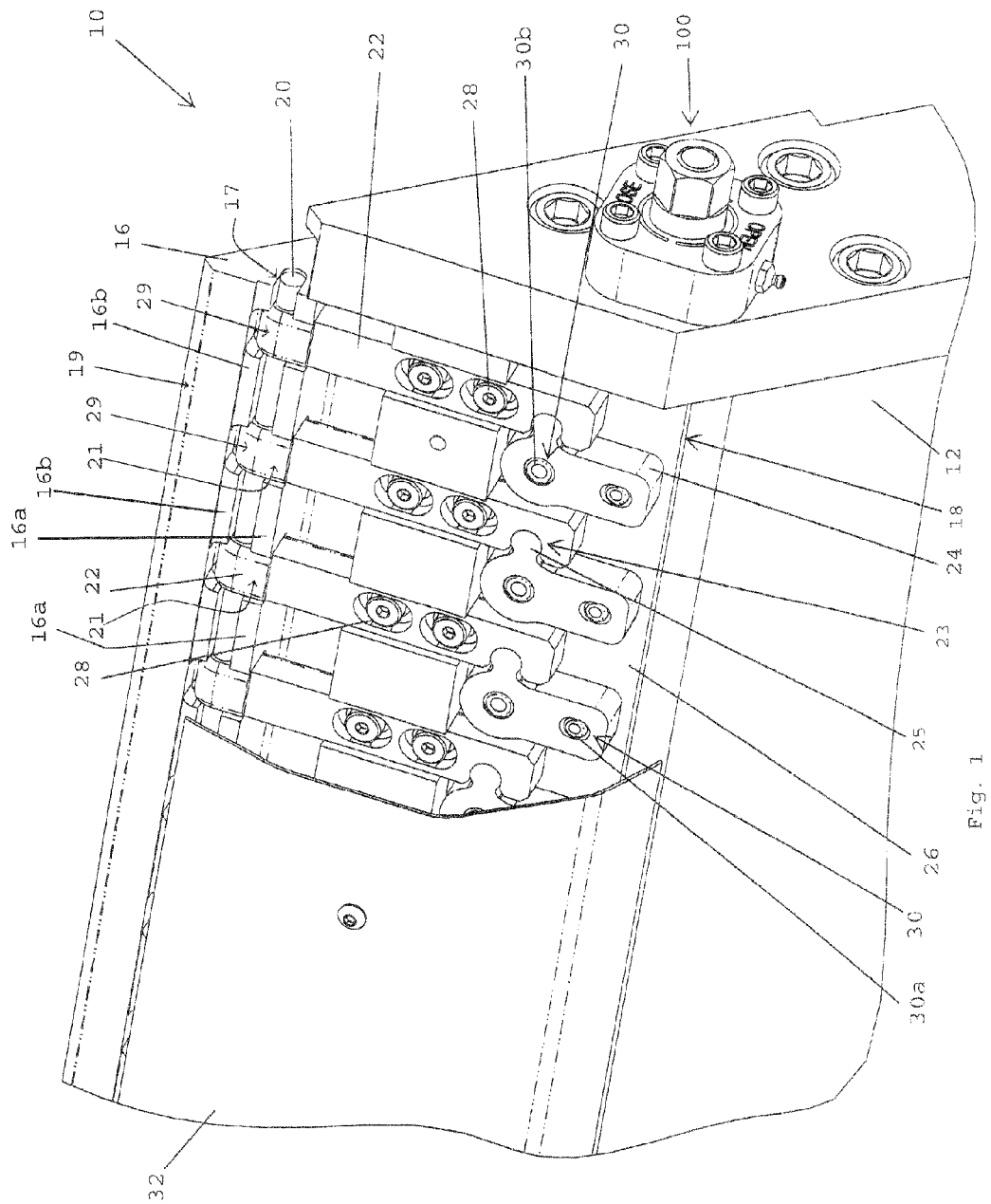
FIG. 1 is a partial perspective view of a feature of the invention.
Figure 2:
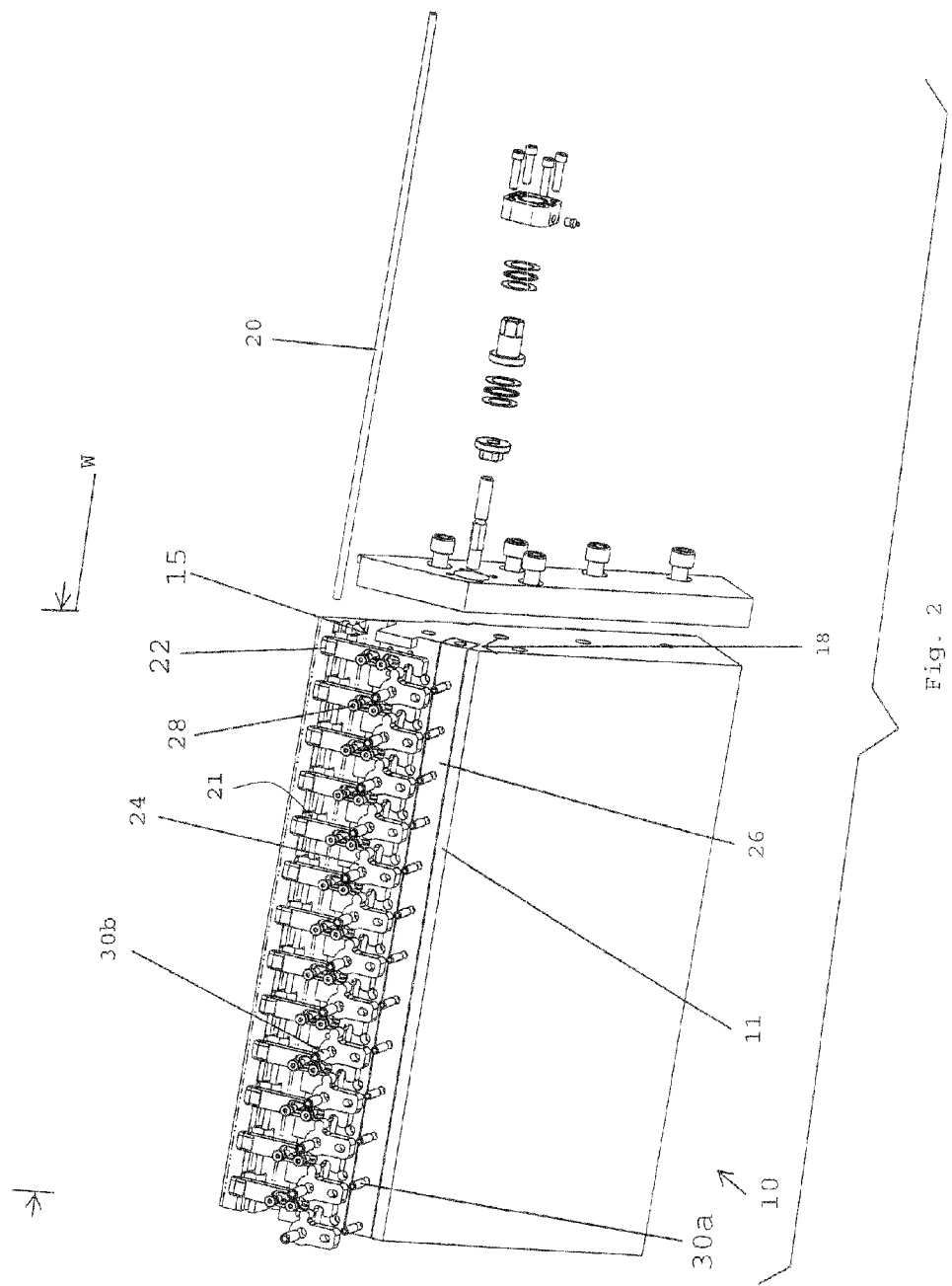
FIG. 2 is a perspective, exploded view of a feature of the invention.

While the invention is amenable to various modifications and alternative forms, specifics thereof have been shown by way of example in the drawings and will be described in detail. It should be understood, however, that the intention is not necessarily to limit the invention of the particular embodiments described.

DETAILED DESCRIPTION OF THE INVENTION

Referring now to FIGS. 1-19, the invention is directed to a lip adjustment system used in, or with, a die assembly comprising at least two die bodies 10 (depicted in FIGS. 4 and 5 as first die body 10*a* and second die body 10*b* for clarity purposes). Portions of the adjustment system may be kept from view by cover 32, as seen in FIG. 1, and may comprise die bodies 10, where at least one of die bodies 10 may have a main body, a hinge 14 and a lip 16. Further, the system may include a cross-bar 20, linear moving members 22, slide fasteners 28, pivoting members 24, pivot fasteners 30 and a sliding member 26 communicating with one another and die body 10. At least one of die bodies 10 (i.e., 10*a* in FIGS. 4 and 5) may include a flexible lip 16 that may be capable of being spatially moved (e.g., moved toward and away from a paired lip) with respect to a lip of the second die body (i.e., 10*b* in FIGS. 4 and 5). The above elements of the adjustment system may be connected in such a manner so as to be able to control movement of lip 16 about hinge 14 by a single-point adjustment control 100.

Numerous terms are used throughout this description to describe features of the invention. These terms may generally be given their commonly understood meaning. For example, "direct contact" means that objects or features are physically touching and "elongated" is commonly known to mean a feature having a first dimension longer or greater than a second, transverse dimension.

Die body 10 includes main body 12 with hinge 14 extending from main body 12 to flexible lip 16. Lip 16 may be separated from main body 12 by hinge 14 and space 15. When lip 16 is adjusted, it may move about hinge 14.

In construction of the system, die body 10 may receive sliding member 26 at any location; for example, sliding member 26 may be inserted into a slot 18 located on a top side 11 of die body 10. Sliding member 26 may engage slot 18 in any manner that allows sliding member 26 to slide along slot 18 in response to an action by single-point adjustment control 100. A nut or other element of adjustment control 100 may be rotated clockwise or counter-clockwise to operate either an opening or closing of the gap 16'. Rotating the nut will cause sliding member 26 to slide within slot 18. Sliding member 26 may be in at least operative communication with a linear moving member 22 and cross-bar 20.

In addition to receiving sliding member 26, top side 11 of die body 10 may receive linear moving member(s) 22. Linear moving members 22 may engage top side 11 in any manner as long as it maintains a sliding engagement with top side 11. Further, linear moving members 22 may extend across space 15 from main body 12 to lip 16, as shown in FIGS. 3-5. Although linear moving member(s) 22 may not directly contact lip 16, it may communicate with lip 16 through its operative connection with cross-bar 20 (as described below).

Pivoting member(s) 24 may operatively connect to linear moving member(s) 22 and sliding member 26. Pivoting member(s) 24 may slidingly abut top side 11 of die body 10 and may be fastened to sliding member 26 and top side 11 through any known fastening or connection means that allows for pivoting of pivoting member 24. For example, pivoting member(s) 24 may be connected to sliding member 26 by any method allowing pivoting member(s) 24 to pivot about the connection, and pivoting member(s) 24 may be connected to top side 11 by any method allowing for pivoting member(s) 24 to pivot about the connection. As seen in FIGS. 1-3, and 5, pivoting member(s) 24 may connect to sliding member 26 via pivot fastener 30*a* and connect to top side 11 via second pivot fastener 30*b*. As mentioned pivoting member(s) 24 may operatively connect to linear moving member(s) 22 and such operative connection, as seen in FIGS. 1 and 3, may operate by tongue 25 of pivoting member(s) 24 rotatably engaging groove 23 of linear moving member(s) 22.

Cross-bar 20 may be received by die body 10 at, or within, lip 16 such that cross-bar 20 directly contacts lip 16. While cross-bar 20 may be configured to operatively contact lip 16, preferably cross-bar 20 directly contacts lip 16. In addition, as mentioned above, cross-bar 20 engages with linear moving member(s) 22. Cross-bar 20 may be in any type of contact with lip 16 and linear moving member(s) 22. For example, cross-bar 20 may be in direct contact with lip 16 and may be engaged through linear moving member(s) 22, where cross-bar 20 may slidably abut lip 16 and may be circumferentially and slidably engaged by linear moving member(s) 22. Cross-bar 20 may be made of any material, shape and size that is capable of operably engaging lip 16 and connecting to linear moving member 22. Preferably cross-bar 20 has a solid cross section, which may be of any configuration. Preferably cross-bar 20 has a solid cross-section oriented generally perpendicularly to lip edge 19. As shown in FIG. 1, cross-bar 20 includes at least one region 29 which surrounds cross-bar 20. Region 29 of cross-bar 20 does not come into contact with lip 16 (remains in a spaced relation with respect to lip 16). As shown in FIG. 1 and FIG. 4, region 29 of cross-bar 20 may be covered, and even surrounded, by member 22. Cross-bar 20 may include a series of regions 29. As may be appreciated in view of FIG. 1, region 29 of cross-bar 20 is concealed by member 22. With reference to FIG. 4 cross-bar 20 is in a spaced relationship with respect to lip 16 (i.e., region 29 of cross-bar 20 does not contact lip 16). Also with reference to FIG. 4, member 22 is in a spaced relationship with respect to lip 16. As shown in FIG. 5A, cross-bar 20 is positioned in lip groove 17 and is in direct contact with lip 16. Lip tab 16a defines part of lip groove 17 and accommodates in part a "pull" action with respect to lip 16 when member 22 is moved in a direction away from lip 16.

Figure 5B:
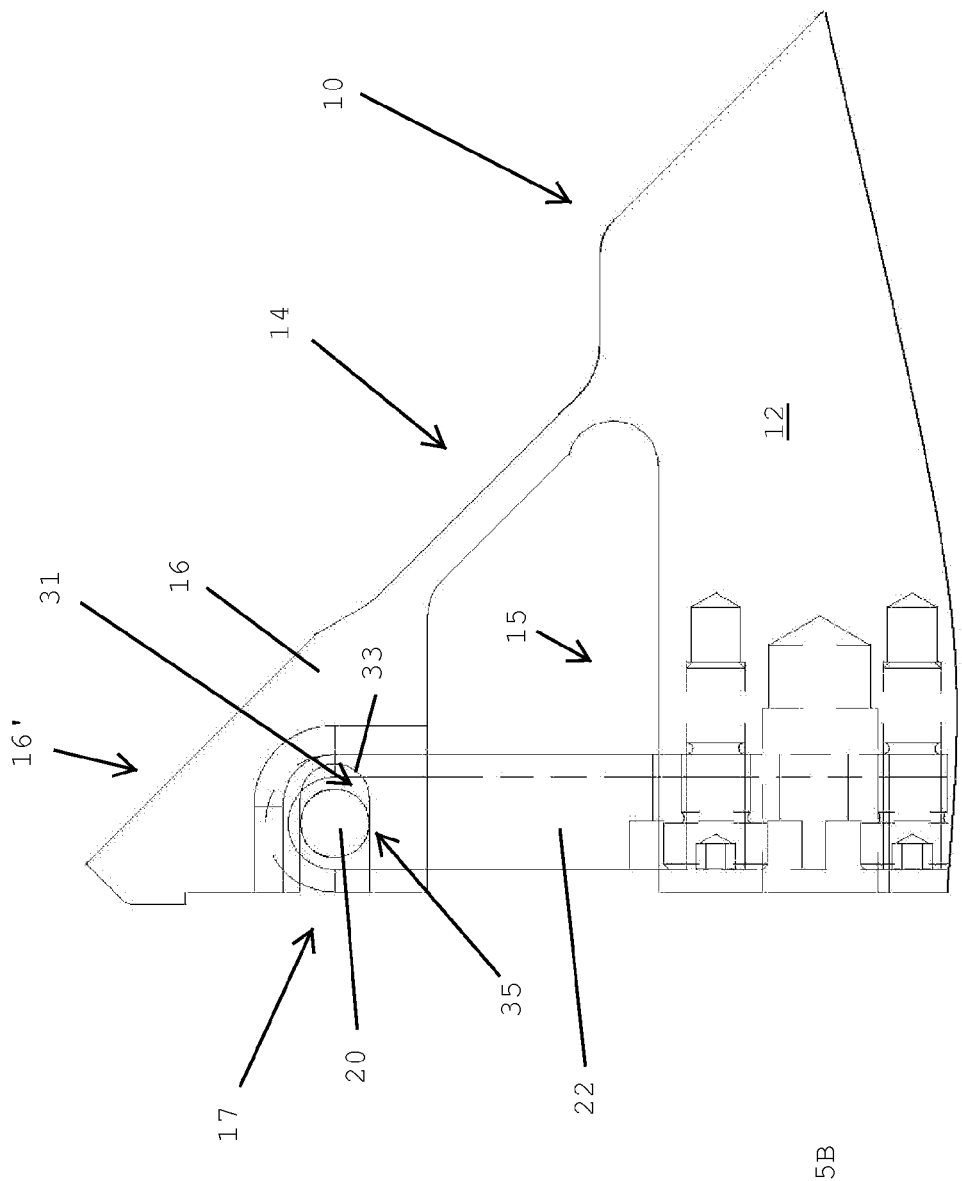
FIG. 5B is a partial cross-sectional view of a further aspect of the invention.
Figure 5C:
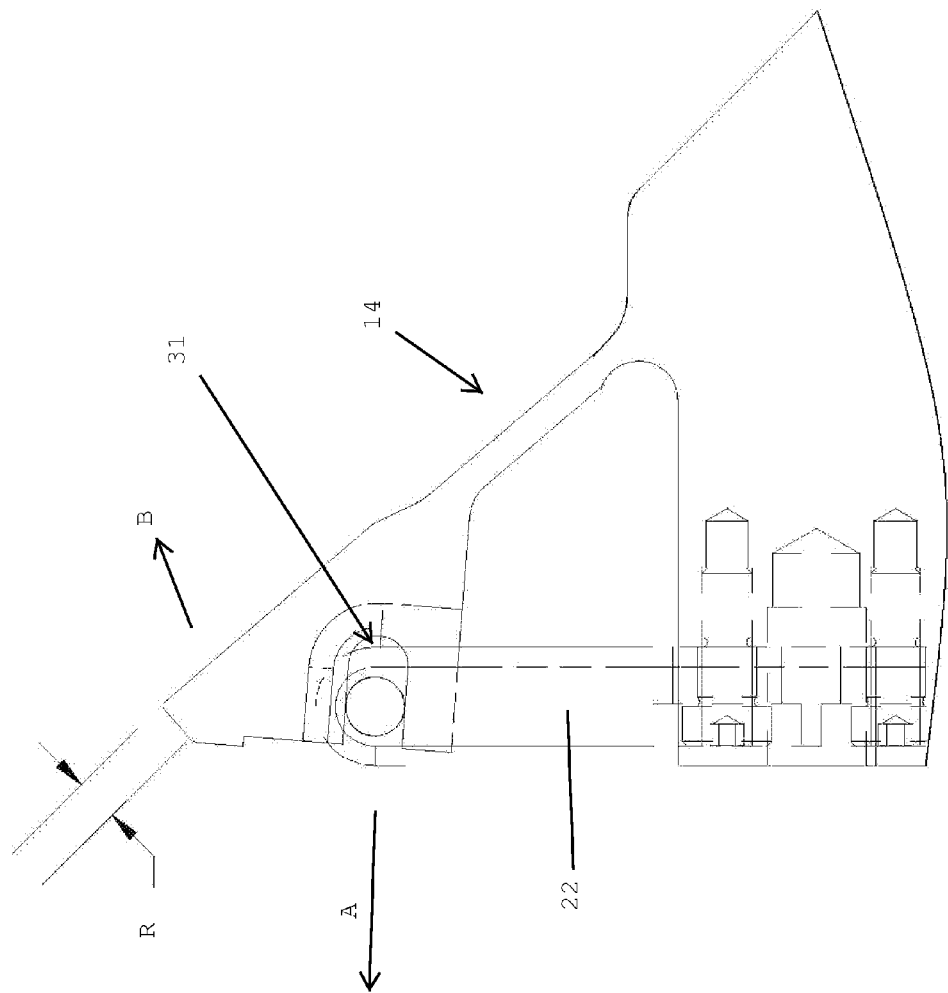
FIG. 5C is a partial cross-section view of a further aspect of the invention.

Preferably, cross-bar 20 may be elongated and have curved cross-section, and more preferably a circular cross-section. A curved or circular cross-section allows for cross-bar 20 to automatically adjust or minimize binding when a force is applied from cross-bar 20 to lip 16. As shown in FIG. 5B, a partial cross-section view of a further aspect of the invention is provided. In FIG. 5B a single die body 10 may be positioned adjacent a second die body. FIG. 5B shows die body 10 in a neutral position where little or no force is being applied to flex lip 16. Particularly, member 22 in neutral mode is not being pushed/pulled with respect to lip 16 or cross-bar 20. In this aspect, a groove space 31 is preferably present between cross-bar 20 and an inner wall portion 33 of lip groove 17. Space 31 allows for cross-bar 30 to adjust or slide within groove 17 as generally shown with respect to FIG. 5C and FIG. 5D. As force is applied to member 22 in a direction toward lip 16, lip 16 tends to flex at hinge 14. Particularly, lip 16 tends to flex in the direction generally shown with respect to arrow B. As force is applied through 22 in a push mode, cross-bar 20 slides within lip groove 17 relative to the direction generally shown with respect to arrow A. As lip 16 flexes in the direction of arrow B the gap 16' is narrowed or closes relative an adjacent lip 16 as may be appreciated. As member 22 applies a push pressure, groove space 31 increases as may be appreciated and as shown in FIG. 5C. Die body 10 may exhibit a flex range R representative of a distance or range where lip 16 may travel when flexing in a closing or narrowing mode.

An opening mode is depicted with respect to FIG. 5D where a pulling force upon member 22 causes lip 16 to flex in a direction generally opposite that of Arrow B. During an opening mode or function cross-bar 20 tends to slide toward inner wall portion 33 (in a direction generally opposite that shown with respect to arrow A). Groove space 31 lessens as may be appreciated and as shown in FIG. 5D. Die body 10 may exhibit a flex range R' representative of a distance or range where lip 16 may travel when flexing in an opening mode. It may be appreciated that the addition of ranges R and R' will indicate the total range of motion that lip may travel in order to accommodate a wide range of gap adjustment ability.

It may be appreciated that cross-bar minimally contacts lip groove 17. Particularly, cross-bar 20 contacts groove along a single point or along a line in two-dimensions. It may be appreciated that cross-bar 20 contacts a wall of groove 17 at tangent line depicted generally as reference numeral 35. A tangent line of contact may preferably exist on both sides of cross-bar 20 in order to reduce or minimize back-lash as may be appreciated in the industry. Applicants believe that having such single line of contact minimizes buckling within the system. Particularly, a cross-bar having a single point or line of contact within groove 17 may more easily travel within the groove 17 due to reduced friction as compared to a contact having a greater surface area. The minimizing of surface area or the single line of contact also allows for concentrating the forces of cross-bar 20 to a desired position within groove (and generally parallel with lip edge 19) to accommodate for efficient flexing of hinge 14 and adjustment of lip 16. Concentrating forces excreted by member 22 away from lip 16 and along tangent line 35, as may be appreciated with respect to FIG. 5D, accommodates an efficient focus of such forces for opening of lip 16. A similar efficiency is realized with the pushing of member 22 toward lip 16 for a closing mode.

Ideally the forces exerted by cross-bar 20 extend horizontally along lip 16 and at a position remote from hinge 14. The curved surfaces of cross-bar accommodate self-adjustment to provide efficient transfer of the forces. Having a curved or circular surface of cross-bar 20 allows cross-bar 20 to adjust or rotate within linear moving member 22 as necessary. Further, and while different lengths are contemplated, cross-bar 20 preferably extends substantially the width W of die body 10. Cross-bar 20 may have a length that is substantially equal to the width of the die body. In alternative aspects, multiple cross-bars 20 can be implemented (either within a single lip groove 17 or within multiple or other lip grooves).

Sliding member 26 may be any material, shape and size capable of sliding within or on slot 18 in main body 12; for example, as seen in FIGS. 6-10, sliding member 26 may be an elongated solid material having first pivot fastener receiving holes 26a and a single-point adjustment receiving hole 26b therein. Holes 26a and 26b may extend at least partially through sliding member 26. In addition, sliding member 26 may have at least one relief 27 recessed in a side of sliding member 26. Relief 27 may be used for any purpose; for example, relief 27 reduces the surface area of the connection between member 26 and main body 12 or slot 18, which allows for reduced force in order to more easily slide member 26. A lubricant may also be provided within the relief 27. The relief 27 may have any dimension; for example, relief 27 may substantially span the length of member 26 and may comprise a third of a height of a side of sliding member 26, for instance. Further, relief 27 may be located on any single or multiple sides of sliding member 26.

Linear moving member(s) 22 may be any material, shape and size; for example, as seen in FIGS. 11-14, linear moving member 22 may be an elongated piece having a cross-bar 20 receiving hole 34 at a first end and groove 23 at a second end. Preferably receiving hole 34 has a generally circular dimension or is otherwise configured to receive cross-bar 20. At a location between receiving hole 34 and groove 23, linear moving member 22 may comprise at least one (e.g., as shown, two) slide fastener holes 36 for receiving slide fasteners 28. Slide fastener holes 36 may be generally rounded and elongated, or may be formed of other shapes that facilitate linear movement of linear moving members 22. In addition, slide fastener holes 36 may have any cross-section shape that facilitates linear movement of linear moving members 22; for example, the cross-section shape may be stepped or have a stepped portion 37 as seen in FIGS. 11 and 14. Further, slide fasteners 28 may slidingly engage linear moving members 22 with top side 11. Slide fasteners 28 may engage top side 11 in any manner, for example, slide fasteners may threadably engage top side 11 and main body 12. Such connection may allow linear moving members 22 to move linearly when such movement has been activated through single-point adjustment device 100 or another mechanism. Slide fasteners 28 may be any shape or size; for example, slide fasteners 28 may be elongated, may be at least partially threaded for threadably engaging main body 12, and may have a head portion 28a having a diameter greater than a diameter of a stem portion 28*b*, as depicted in FIG. 4. Head portion 28*a* may abut stepped portion 37 of slide fastener hole 36. As such, linear moving member 22 may be slidingly secured to body 10.

As seen in FIG. 4 and FIGS. 5A-5D, member 22 extends over and past space 15 which is defined in part by main body 12, hinge 14 and lip 16. As further shown, member 22 extends from main body 12, across space 15 and over lip 16.

As shown for example in FIG. 11, member 22 includes groove 23 which is positioned opposite receiving hole 34. Groove 23 is positioned opposite cross-bar 20 and lip 16. Groove 23 is also configured to be a groove or indentation within member 22 at side edge 39*a*. Having groove 23 at side edge 39*a* allows for an interconnected tongue and groove sliding fit relationship with tongue 25 which extends from side edge 39*b* of pivoting member 24. Such relationship also allows for interconnection along a common plane that runs generally parallel with lip edge 19 and accommodates a compact configuration.

Pivoting member(s) 24 may be any material, shape and size; for example, as seen in FIGS. 15-18, pivoting member 24 may have a rounded end 24*b* and a generally or relatively squared end 24*a* separated by a middle portion 24*c*. While end 24*b* is not required to be rounded, having a rounded dimension lessens unwanted contact with other elements when pivoting member is moved or pivots. Tongue 25 extends from pivoting member 24. Tongue 25 may extend from the rounded end of pivoting member 24 or any other portion thereof. Tongue 25 may be shaped so as to fit within groove 23 of linear moving member 22 and may be integrally formed with, or formed separate from, other portions of pivoting member 24. Preferably tongue 25 is integrally formed with pivoting member 24. Preferably tongue 25 extends generally perpendicular to a longitudinal axis of pivoting member 24. Tongue 25 may also be a projection that projects from pivoting member 24. A projection may also take on a form that is the same or similar to tongue 25 or different from tongue 25. The projection would also engage with linear moving member 22.

Rounded end 24*b* of pivoting member 24 may comprise a pivot hole 38, preferably circular, for receiving second pivot fastener 30*b*. Pivot hole 38 may be of many different dimensions and is preferably circular. As seen in FIG. 5A, second pivot fastener 30*b* may engage pivoting member 24 with main body 12 through pivot hole 38, allowing pivoting member 24 to pivot at a location about second pivot fastener 30*b*. Second pivot fastener 30*b* may be at least partially threaded and may engage main body 12 through top portion 11 in any manner, for example, second pivot fastener 30*b* may threadably engage main body 12. Squared end 24*a* of pivoting member 24 may comprise an elongated pivot hole 40 for receiving first pivot fastener 30*a*. First pivot fastener 30*a* may engage pivoting member 24 with sliding member 26 through elongated pivot hole 40, allowing pivoting member 24 to pivot and slide at locations about first pivot fastener 30*a*. First pivot fastener 30*a* may be at least partially threaded and may engage sliding member 26 in any manner, for example, first pivot fastener 30*a* may threadably engage sliding member 26. Further, both pivot hole 38 and elongated pivot hole 40 may have any shaped cross-sections; for example, holes 38 and 40 may have consistent cross-sections, as seen in FIG. 18. While hole 40 is preferably an elongated pivot hole generally as shown, and hole 38 is preferably a circular hole generally as shown, it may be appreciated that hole 40 may alternatively be circular and hole 38 alternatively elongated to achieve a similar operation. In the preferred case, however, pivoting member 24 simply pivots about pivot fastener 30*b*, and pivoting member 24 both pivots and slides about pivot fastener 30*a*. Preferably tongue 25 extends from pivot 30 perpendicular to the axis of rotation of pivot 30 which is aligned through fastener 30*b*. Preferably pivot 30 is positioned on die body 10 at main body 12 and away from lip 16, such that space 15 lies between pivot 30 and lip 16 (as generally shown in FIG. 4 and FIG. 5A). Preferably space 15 also lies between cross-bar 20 and pivot 30.

In operation, as sliding member 26 is adjusted within or upon the main body 12 sliding member 26 may act on a plurality of pivoting members 24 by pivoting the pivoting members 24 about pivot fasteners 30. The elongated aspect of slide fastener hole 36 allows for sliding member 22 to slide or translate along a single path. While pivoting member 24 pivots, linear moving member 22 moves only linearly. As a result of the adjustment of sliding member 26 and the pivoting of pivoting members 24, tongue(s) 25 rotate within groove(s) 23 causing a plurality of linear moving members 22 to move linearly and substantially perpendicularly to the movement of sliding member 26 (although, the system may operate with any angle between movements of the linear moving members 22 and sliding member 26). As linear moving members 22 move, linear moving member 22 act on cross-bar 20, which, in turn, either pushes against or pulls on lip 16. As a result of the forces exerted on lip 16 from cross-bar 20, lip 16 may move about hinge 14. As lip 16 moves and is adjusted, dimensions of a gap or space between lips 16 of die bodies 10*a*, 10*b* are adjusted. Such a process of adjusting the position of flexible lip 16 may result in efficient and repeatable adjustment of lip 16.

Preferably tongue 25 has curved surface that mates with a comparable curved surface of groove 23. The curved surfacing accommodates efficient and automatic self-adjustment within the tongue-groove association. As forces naturally build in response to tongue 25 rotating within groove 23, an otherwise binding or buckling occurrence is minimized since the surfaces are more able to slide upon each other.

In one aspect, tongue 25 inserts within groove 23 preferably such that an engagement is achieved along a 180 degree span of tongue 25. In other words, tongue 25 engages groove 23 along a 180 degree span within groove 23. As pivoting member 24 pivots, the curved surface of tongue 25 slides within groove 23 yet maintains a 180 degree engagement within groove 23.

As shown, and preferably, linear moving member 22 is in a spaced relationship with respect to lip 16. For instance, member 22 does not contact lip 16, rather, member 22 pushes or pulls cross-bar 20 which is in direct contact with the lip groove 17. Groove 17 may be a machined groove within lip 16 and configured to receive cross-bar 20. Cross-bar 20 is laid or inserted into groove 17 (and runs through receiving hole(s) 34 of member(s) 22. Groove 17 spans the width or substantially the width W of die body 10 and corresponding lip 16. Cross-bar 20 is preferably a hardened rod which is strong and resists deflection. Preferably cross-bar 20 is a single piece made of metal or metal alloys, and is preferably homogeneous throughout. Preferably cross-bar 20 has a hardness that is greater than the hardness of lip 16. The hardness of cross-bar 20 provides for a differential with respect to the materials of the lip 16 and moving member 22. The use of different materials resist sticking or galling and allows for more efficient operation. Use of the cross-bar 20 within groove 17 has reduced and/or eliminated corrugation (i.e., wavering or rippling) along lip 16. Particularly, the forces imparted by the respective members 22 are believed to be substantially dispersed along cross-bar 20 to provide a more uniform force being applied against lip 16 such that lip 16 remains substantially straight along the line of lip edge 19. This results in a more uniform gap along the line of die body 10. Various surfaces of the above components may also be hardened to minimize deflection and also to reduce sticking or galling.

Cross-bar 20 preferably inserts within groove 17 while also connecting to at least one moving member, and preferably a plurality of moving members. Moving members may include many varieties of moving members. Preferably moving members are linear moving members 22. Cross-bar 20 preferably inserts within a moving member. As shown, cross-bar 20 inserts within linear moving member 22. At least a portion of cross-bar 20 is surrounded by at least one of the moving members, such as linear moving member 22. Preferably cross-bar 20 includes at least one portion surrounding the cross-bar 20 that remains in a spaced relation with respect to the lip 16 (i.e., a portion of cross-bar 20 does not contact lip 16, and preferably does not contact lip 16 at any time or at any position). Such portion may include the portion of cross-bar 20 that is surrounded by a moving member, such as by linear moving member 22. As shown, lip 16 includes at least one transverse slot 21, and preferably a plurality of transverse slots 21 corresponding with moving members. Transverse slot 21 intersects with groove 17. Transverse slot 21 receives a moving member, such as linear moving member 22. In one aspect, groove 17 is situated between lip tab 16a and lip tab 16b. A plurality of lip tabs 16a and 16b may be provided and in part define transverse slot 21. Transverse slot 21 is generally positioned between adjacent lip tabs 16a, 16a as seen in FIG. 1. A portion of a moving member, such as linear moving member 22 may be positioned within transverse slot 21, situated between adjacent lip tabs 16a, 16a. Moving member may also be situated between adjacent lip tabs 16b, 16b. It may be appreciated that a moving member is preferably a linear moving member such as linear moving member 22, yet in some aspects a moving member may be some other type of member that moves (whether or not linearly or exclusively linearly) or that places force on cross-bar 20.

It may be appreciated that lip 16 may alternatively lack a lip groove 17 as shown, and may use some other type of groove which allows linear moving members to 22 to push against cross-bar 20 (or alternatively, there may be no groove at all). For instance, and in a push-only application, cross-bar 20 may be situated against or abut a lip tab 16b (without lip tab 16a which in part defines groove 17 and which is preferably required to accommodate a "pull" action of the lip 16) or be positioned in a cradle or other indentation made into lip 16. It may be appreciated that lip tabs 16a are used in order to accommodate a pull action of lip 16 (i.e., where cross-bar 20 is pulled in a direction away from lip edge 19). Particularly, with reference to FIG. 1, when pivoting members 24 pivot in a clock-wise direction, linear moving members 22 move in a direction away from lip edge 19, and cross-bar 20 applies force against lip tabs 16a to pull lip 16 open and to widen the gap 16'. It may be appreciated that either a "push" or a "pull" (or both) action may be accommodated for adjusting lip 16 in aspects of the invention.

The positioning of lip groove 17 and cross-bar 20 is important to the operation of the apparatus. The forces imparted by cross-bar 20 are advantageously positioned closer to the lip edge 19 as compared to other devices. Moreover, such forces are presented generally linearly along the same line as (or substantially parallel to) lip edge 19. Thus, substantially all of the force acting upon cross-bar 20 is focussed along the span of lip edge 19 (as opposed to a configuration where forces might be transverse to lip edge 19 as in the case of using a bolt or other type of fastener that mounts into lip 16 in a generally transverse orientation and projecting closer to the hinge 14). Positioning cross-bar 20 linearly and close to lip edge 19 provides for a greater leverage to be imparted on lip 16 which results in a greater flex action (or less force may be used in order to have a desired flexing of lip 16 due to the mechanical advantage of the positioning the cross-bar 20 close to lip edge 19). There is an efficiency in having linear moving members 22 move only linearly, and combining such linear action of members 22 with the mechanical advantage and positioning of the cross-bar 20 allows for ease and efficiency in applying the directed forces (i.e., less force is required to be imparted, for instance, at single point adjustment control 100) and a great range of flex of lip 16 is achieved.

In a further aspect pivoting member 24 may include a tongue in the form of a gear or gear thread; the gear may mesh with a worm or worm gear, or the grooves of a worm gear. When pivoting member 24 pivots, tongue/gear which projects from pivoting member 24, which engages a groove or worm groove of linear moving member 22, moves the linear moving member 22. The gear thread may be a plurality of threads integrally formed on pivot member 24 and match with a plurality of grooves associated with linear moving member 22.

In a further aspect linear moving member 22 may alternatively include a tongue similar to or different from tongue 25, and pivot member 24 may include a groove similar to or different from groove 23. As pivoting member 24 pivots, the groove therein would pivot and cause the tongue, which engages within the groove, to move, thus resulting in movement of member 22.

Figure 19:
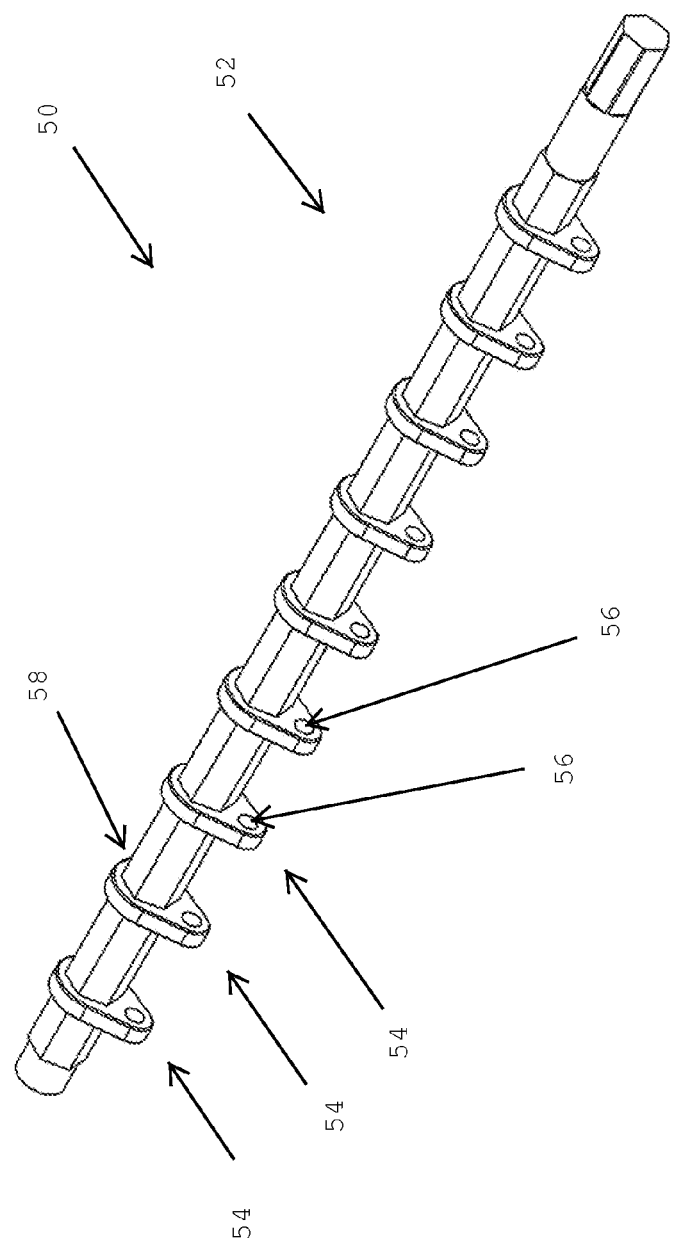
FIG. 19 is a perspective view of a feature of a further aspect of the invention.

In a further aspect a shaft 50, such as rotating shaft 52 having lobes 54 extending therefrom, may be used instead of or as an alternative to a slidinge member 26. In one aspect shaft 52 may include lobes 54 as shown in FIG. 19. Shaft 52 may span the width W, or substantially the width of lip 16 and has an axis of rotation generally parallel to lip edge 19. Shaft 52 may be disposed in main body 12. Shaft 52 may have a length greater than width W. In operation, as shaft 52 rotates, lobes 54 (which may have an eccentric or oblonged shaped perimeter, and preferably project from shaft 52) impart force upon moving member(s) 22. Such operation allows at least for a one-way adjustment of lip gap (i.e., rotation or pivot of shaft 52 causes lip 16 to be pushed, thereby narrowing the gap between lips of opposing die bodies 10). Eccentric lobes 54 are cams or operate as cams to mechanically force members 22 to move as shaft 52 is rotated. Lobes 54 may also fasten to linear moving members 22 so that a push and pull action may be achieved. Lobe 54 may connect with a member 22 in a variety of configurations. In one instance, lobe 54 preferably includes a member connecting hole 56 in order to connect lobe 54 with a corresponding member 22. Members 22 may have associated holes for receiving a fastener which is positioned through member connecting holes 56 and into a member 22. In one instance a bolt or screw or other element having a major axis may be inserted into connecting hole 56 such that the major axis is generally parallel to the axis of rotation of shaft 52. Lobe 54 project from shaft 52. Member 22 connects to lobe 54 at a position off-set from the axis of rotating shaft 52. Hole 56 may be configured to be an elongated hole (or slightly elongated) to accommodate for linear movement of member 22 while lobe 54 undertakes a rotating or angular movement).

Rotating shaft 52 is in operative communication with lip 16. As rotating shaft 52 rotates, lip 16 moves in a direction transverse to linear lip edge 19. Rotating shaft 52 is in operative contact with at least one linear moving member 22. Moving member 22 may directly contact lip 16, yet preferably moving members 22 are in operative communication with lip 16, and more preferably moving members 22 connect with cross-bar 20 which in turn contacts lip 16. It may be appreciated that moving members 22 may have various configurations in order to accommodate operation with rotating shaft 52. A single-point adjustment control may be used to rotate rotating shaft 52.

In one aspect, rotating shaft 52 may have a polygonal cross-sectional shape, such as a hexagonal cross section (or other polygonal cross-sectional shape, or even a round configuration) so that lobes 54, which have a corresponding shaft hole 58 defined therein, may be inserted upon shaft 52 for secure rotation. Lobe 54, having a shaft hole 58 may be inserted upon shaft 52 for a secure fit and so that lobe 54 does not spin with respect to shaft 52. As shaft 52 rotates, lobes 54 which are affixed to the shaft 52 also rotate. It may be appreciated that other configurations of rotating shafts and/or lobes 54 may be used in order to exert a force upon linear moving members 22. Applicants appreciate that there may be other rotating shafts having cams or oblonged shapes that may be used to contact elements that operatively communicate with, and push and/or pull, lip 16.

The lip adjustment system provides a repeatable gap adjustment, and presents little, if any, lag from one end of the lip to the other end (i.e., the gap as measured proximal the adjustment control 100 is the same as, or acceptably the same as, the gap as measured distal the adjustment control 100). The die industry places great emphasis on exact and accurate machinging of components so that a die may operate efficiently. Applicants appreciate that the present system and components, as compared to other designs, accommodate increased uniformity and consistency of produced components. Also, the use of a cross-bar eliminates the need for bolting or screwing or rigidly fastening any component to the lip, and the tongue-in-groove feature accommodates for efficient transfer of rotational forces into linear forces. The individual components align with each other for surface area efficiency (and optimal leverage) that results in the ability to move the components, and the lip, with minimal force. Applicants have found that the above efficiencies and accurate adjustments exist in die products having great widths, including dies having lip widths of over 100 inches.

Some common or traditional dies that have a moveable lip using a conventional lip bolt system (i.e., one that does not have a single-point adjustment mechanism) may have a flex range of, for instance, 0.040 inches, 0.075 inches or 0.100 inches. This is accomplished by moving a single lip. In some instances an extended range die may be built where the single lip (using conventional lip bolt system) has a range of 0.100 inches. A dual lip extends the range of that lip opening. The second lip preferably has a single point adjustment which pulls the lip open and pushes the lip closed, for a total of 0.200 inches. Such range might be accomplished by using two lips of the conventional lip bolt system, yet the time required to adjust the lip makes it impractical such that the die would be rarely made and rarely used. Applicants have found that using a single-point adjustment lip of under the present system, and having a range of 0.100 inches, when paired with another lip having a range of 0.100 inches, allows for a total stroke amount of 0.300 inches (the single-point lip moves a total of 0.200 inches, or 0.100 inches on each side of center; while the conventional lip may move 0.100 inches). In some instances under the present system the total stroke is approximately 0.375 inches, and can be made as a single-point adjustment.

The lip adjustment system may be used in general extrusion production and in order to vary the total stroke or the range of the gap. The lip adjustment system may also be used in extrusion die cleaning processes. For example, when using extrusion dies, particles or carbon may form within the lip gap causing a blockage or partial blockage of the lip gap. Using the described adjustment system, lips 16 may be opened to create space for contamination materials (e.g., carbon particles) to be flushed through the open die lips 16. Die lips 16 may then be quickly and accurately returned to a preset gap dimension after the contamination materials have been flushed through lips 16.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise specifically indicated. While the particular LIP ADJUSTMENT SYSTEM HAVING CROSS-BAR as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A die apparatus comprising:
   a die body having a flexible lip; and
   a cross-bar contacting said lip and including at least one region surrounding said cross-bar about a longitudinal axis of said cross-bar that is in a spaced relation with respect to said lip.

2. The apparatus of claim 1 where said cross-bar comprises a single-piece metal rod having a solid cross-section.

3. The apparatus of claim 1 where said lip includes a groove, said cross-bar is positioned within said groove.

4. The apparatus of claim 3 where said lip includes at least one transverse slot that intersects with said groove.

5. The apparatus of claim 1 where said lip substantially spans a width of said die body, said cross-bar has a length substantially equal to said width.

6. The apparatus of claim 1 where said lip includes a groove and said cross-bar inserts within said groove while connecting to a plurality of moving members.

7. The apparatus of claim 6 where said moving members are linear moving members.

8. The apparatus of claim 6 where said cross-bar inserts within each of said plurality of moving members.

9. The apparatus of claim 6 where at least a region of said cross-bar is surrounded by at least one of said moving members.

10. The apparatus of claim 1 further comprising a moving member, said moving member connected to said cross-bar.

11. The apparatus of claim 10 where said moving member receives said cross-bar at a receiving hole defined by said moving member.

12. The apparatus of claim 10 where said moving member is a linear moving member, said moving member including an elongated hole.

13. The apparatus of claim 10 further comprising a pivoting member, said pivoting member engages said moving member.

14. The apparatus of claim 13 where said pivoting member includes a tongue which engages within a groove of said moving member.

15. The apparatus of claim 13 where said pivoting member is an eccentric cam shaft, said cam shaft engaging said moving member.

16. A die apparatus comprising:
a die body having a flexible lip; and
a cross-bar contacting said lip where said cross-bar has a plurality of regions surrounding said cross-bar that remain in a spaced relation with respect to said lip and where a plurality of moving members connect to said cross-bar at respective said regions.

17. A die apparatus comprising:
a die body having a flexible lip and defining a lip edge;
at least one cross-bar contacting said lip at spaced-apart intervals and having a longitudinal axis oriented substantially parallel with said lip edge; and
at least one moving member connected to said cross-bar between at least two of said spaced-apart intervals;
where said lip may be moved in response to movement of said moving member.

18. The apparatus of claim 17 where said lip includes a transverse slot in communication with a lip groove, said lip groove receives said at least one cross-bar, said transverse slot receives said moving member.

19. The apparatus of claim 17 further comprising a plurality of moving members connected to said cross-bar, each of said moving members being a linear moving member, and where said linear moving members move in response to a pivoting member.

20. A die apparatus comprising:
a die body having a flexible lip and defining a groove which receives a cross-bar in contact with said lip; and
a moving member received in a transverse slot defined by said lip, said transverse slot intersecting said groove.

21. The apparatus of claim 1 where said cross-bar has a plurality of regions surrounding said cross-bar about a longitudinal axis of said cross-bar that are in a spaced relation with respect to said lip.

* * * * *